United States Patent [19]
Padden et al.

[11] Patent Number: 5,456,107
[45] Date of Patent: Oct. 10, 1995

[54] MODULAR GAS FLOWMETER

[75] Inventors: Harvey F. Padden, Pompton Lakes; Frank C. Rumore, Mahwah; Scott R. Calvert, Hewitt, all of N.J.

[73] Assignee: Computer Control Corp., Pompton Plains, N.J.

[21] Appl. No.: 229,385

[22] Filed: Apr. 18, 1994

Related U.S. Application Data

[62] Division of Ser. No. 119,808, Sep. 10, 1993, which is a continuation of Ser. No. 982,150, Nov. 25, 1992, abandoned, which is a continuation of Ser. No. 703,258, May 20, 1991, abandoned.

[51] Int. Cl.$^6$ .................................................. G01M 19/00
[52] U.S. Cl. ..................... 73/239; 73/3; 73/232; 73/861; 73/861.54
[58] Field of Search .................. 73/3, 232, 239, 73/861, 861.54

[56] References Cited

U.S. PATENT DOCUMENTS

| | | | |
|---|---|---|---|
| 1,238,498 | 8/1917 | Dawley | 73/861.54 |
| 2,772,664 | 12/1956 | Jones et al. | 73/239 |
| 3,344,667 | 10/1967 | Maltby | 73/239 |
| 3,768,510 | 10/1973 | Reves | 73/3 |
| 4,361,051 | 11/1982 | deFasselle et al. | 73/861.54 X |
| 4,463,603 | 8/1984 | Welker | 73/239 X |
| 4,781,066 | 11/1988 | Pope et al. | 73/239 |
| 5,076,093 | 12/1991 | Jones, Jr. et al. | 73/3 |

*Primary Examiner*—Richard E. Chilcot, Jr.
*Assistant Examiner*—Jewel V. Artis
*Attorney, Agent, or Firm*—Ostrolenk, Faber, Gerb & Soffen

[57] ABSTRACT

A high accuracy flowmeter for testing and calibrating flowmeters and the like, and more particularly a positive displacement flowmeter which may include a cylinder (12), a piston (10) within the cylinder (12) which makes a clearance seal with the inside of the cylinder, an encoder (40) associated with the piston, and a control valve (V) for controlling the supply of a fluid flow (A1) to be measured. The flowmeter may have an arrangement for receiving differently-sized interchangeable modules for measurement of different flow rate ranges, each module having for example a compatible piston and cylinder of a predetermined size. The flowmeter includes a channel for receiving a fluid flow so as to move the piston (10) within its cylinder (12); and a device (36, 38) including the encoder (40) for detecting movement of the piston and generating electrical signals representative of the fluid flow to be measured. The movement of the piston is detected as a function of a known volume of the enclosure traversed by the piston, and a measured variable elapsed time over which the piston traverses the volume. Preferably, the flowmeter system includes a damping device (FIGS. 6A–6D) which may be mechanical, pneumatic, or fluidic. A memory device (e.g., 109) may be provided for supplying data representative of the capacity of the cell, and the fluid flow may be calculated (100) as a function of the cell capacity.

26 Claims, 8 Drawing Sheets

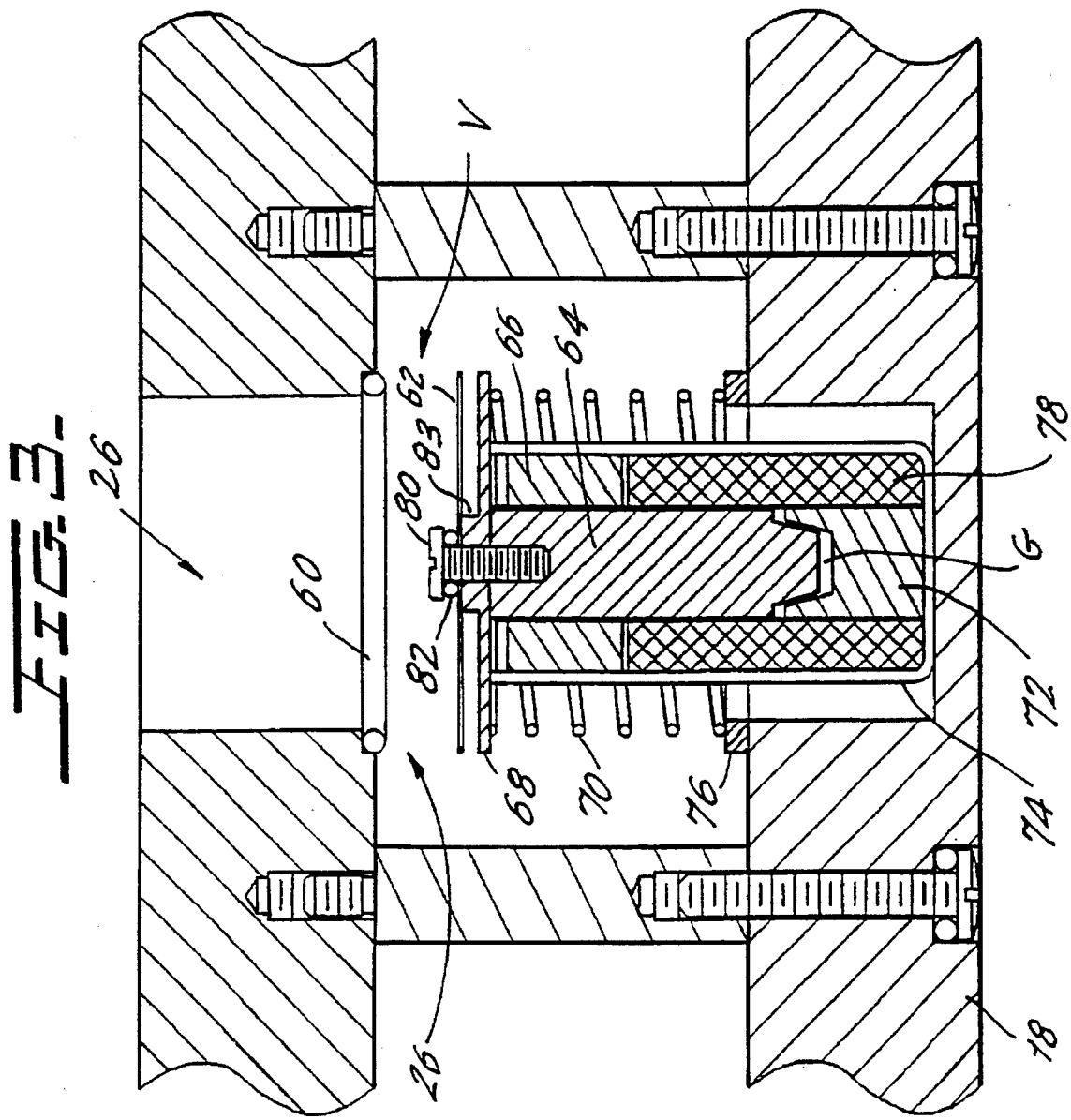

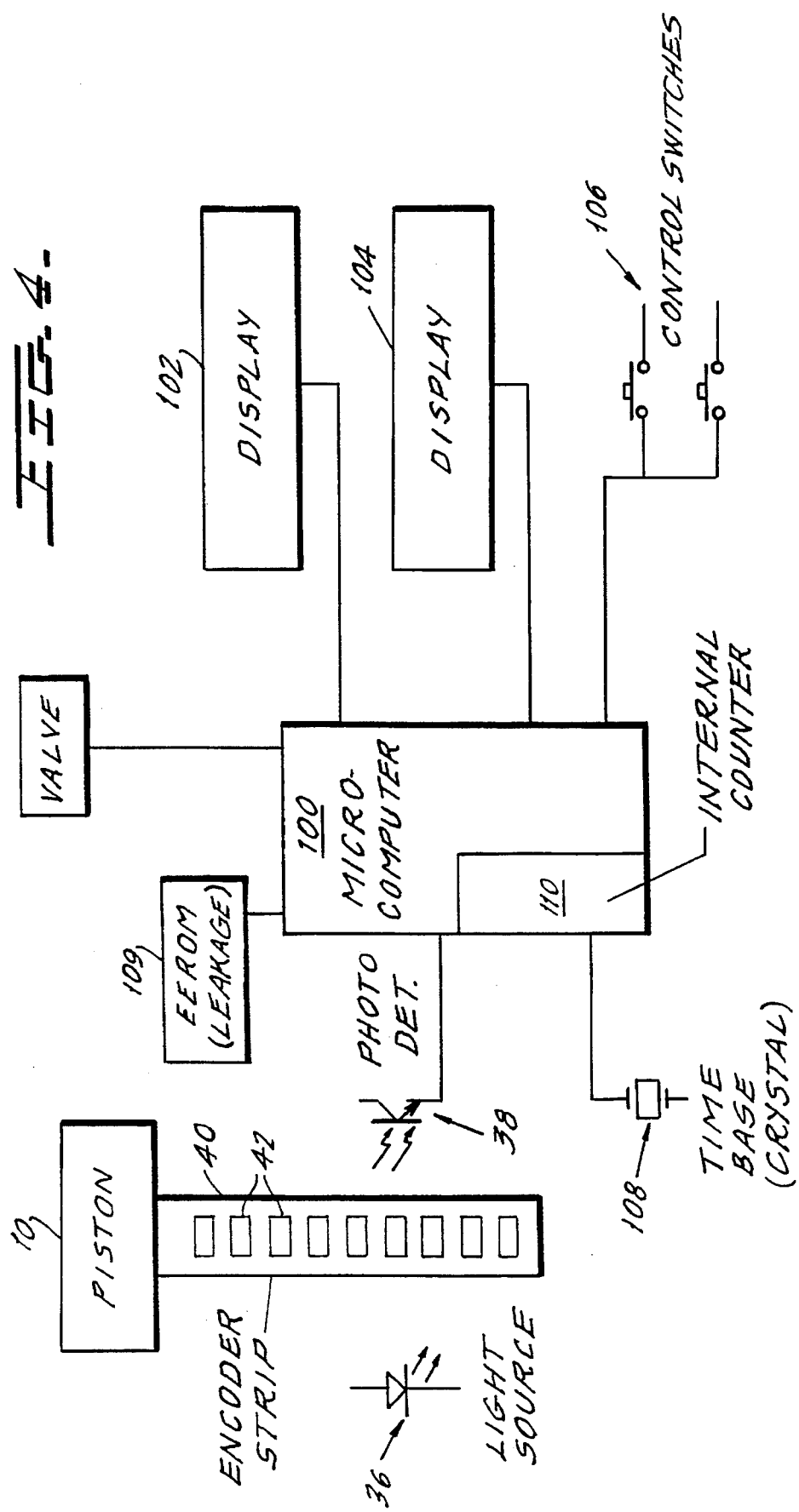

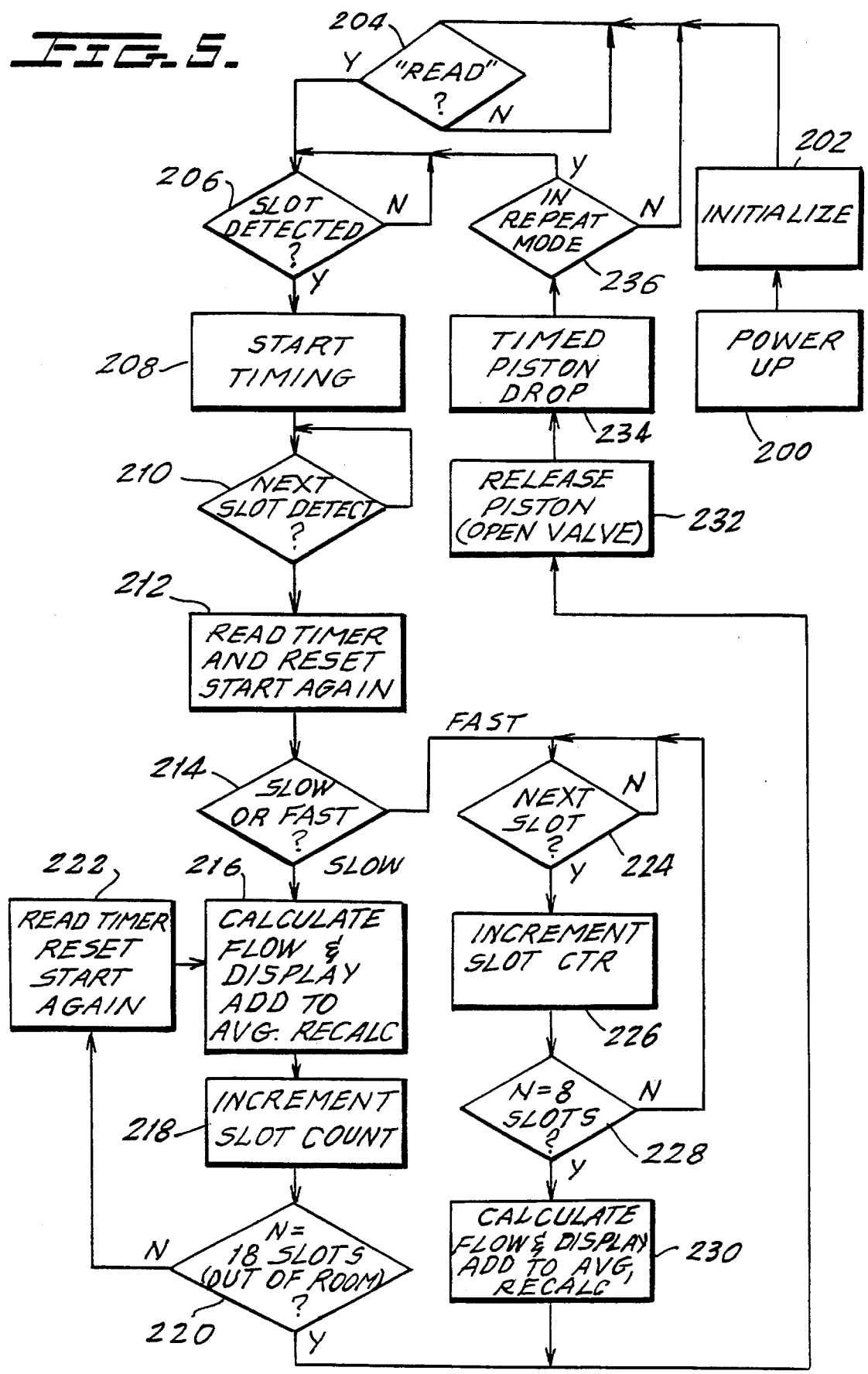

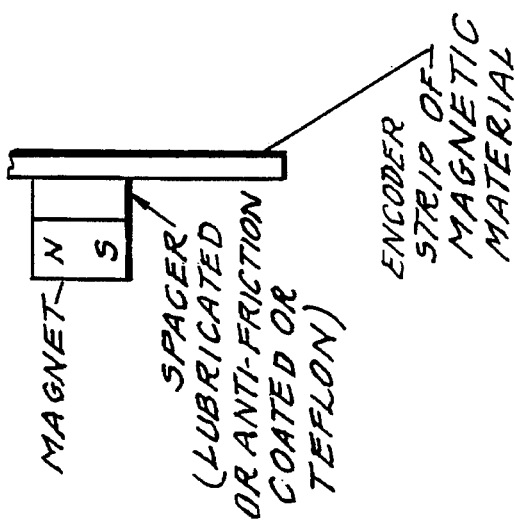
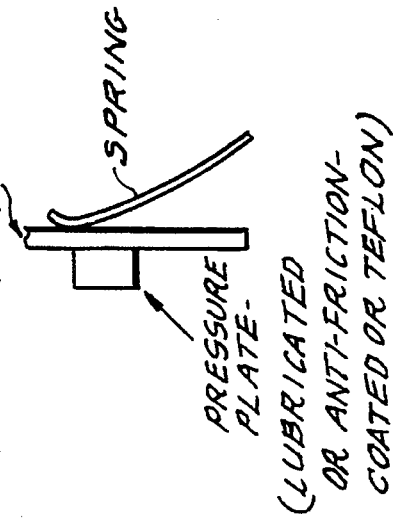
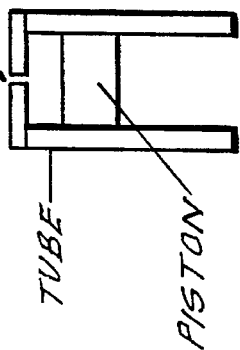
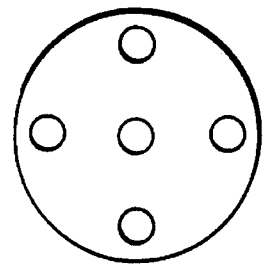
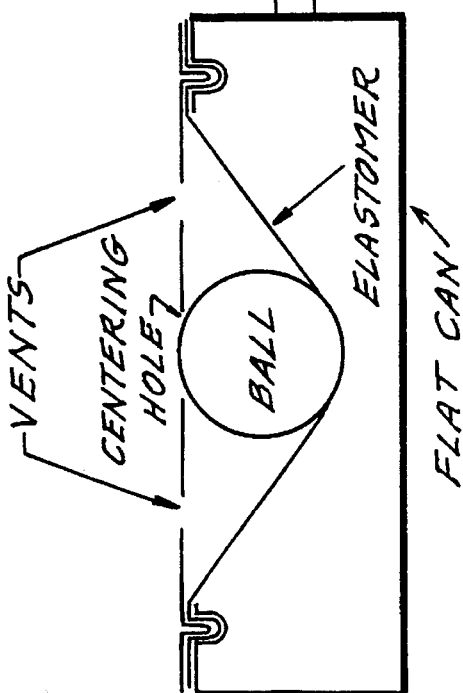

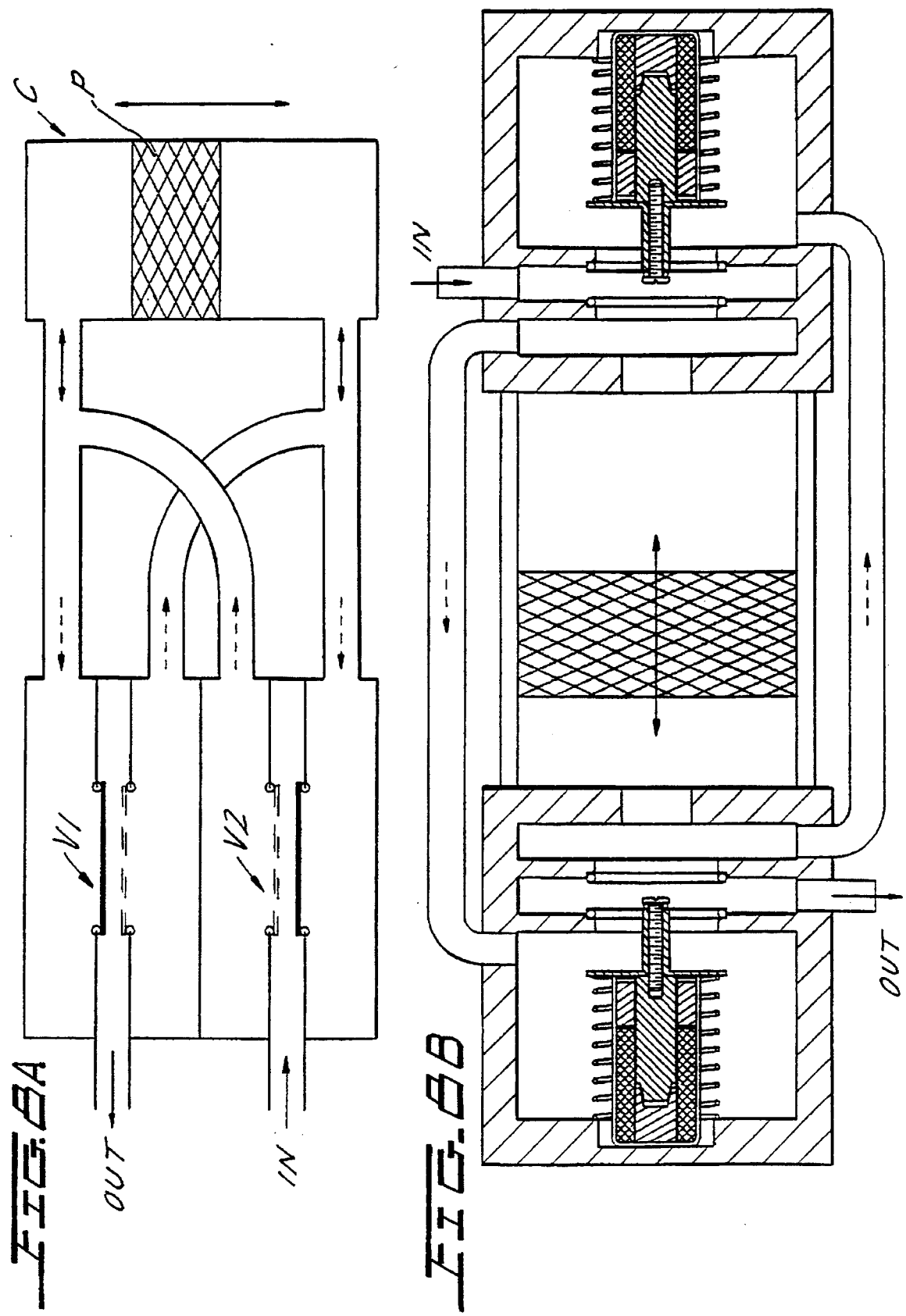

MODULAR GAS FLOWMETER

This is a division of application Ser. No. 08/119,808 filed Sep. 10, 1993; which is a continuation of application Ser. No. 07/982,150 filed on Nov. 25, 1992 (now abandoned); which is a continuation of application Ser. No. 07/703,258 filed on May 20, 1991 (now abandoned).

BACKGROUND OF THE INVENTION

1. Field of the Invention

The invention relates to a high-accuracy flowmeter for testing and calibrating flowmeters and the like, and more particularly to a positive displacement flowmeter which may include a cylinder, a piston within the cylinder which makes a clearance seal with the inside of the cylinder, an encoder associated with the piston, and a control valve for controlling the supply of a fluid flow to be measured. Other features are also disclosed.

2. Description of Related Art

A known type of positive displacement flow calibrator measures the time a soap film bubble takes to move a known distance in a tube. These devices are position-sensitive, must be kept filled with solution, are unpredictable (double bubbles, broken bubbles, etc.) and may inject moisture into the pump being calibrated. Accuracy can be compromised by change of bubble shape during a reading, particularly at high flow rates. Another important disadvantage of these bubble flowmeters is that many seconds may be required to obtain a reading at full accuracy, particularly under low flow conditions, because their sensors are a fixed distance apart. There is no possibility of obtaining intermediate readings. Also, remote or automatic operation is impossible, since the flowmeter must be maintained and bubble quality must be observed.

Other displacement flowmeters use piston-and-cylinder arrangements of various types, which inherently create friction and are unusable at low-pressure or low-flow levels, even if Hg or oil seals are used. Liquid seals may also contaminate the system being measured.

For example, U.S. Pat. No. 2,320,447 to Raymond discloses a volume flowmeter particularly intended for high-liquid-pressure applications, in which a fluid flow is diverted from a main flow line into a chamber containing a piston. The force of the fluid moves the piston along the chamber. The rate of flow is then calculated by measuring piston displacement during a given predetermined time interval. Raymond describes a series of sealing grooves in his piston which apparently contain sealing elements or a fluid lubricant and are said to prevent leakage around the piston. A significant disadvantage of Raymond's device is that contact between the piston and cylinder as disclosed therein causes excessive friction in low-pressure and/or low-flow measurements.

U.S. Pat. No. 2,892,346 to Sargent discloses a complicated volume flowmeter in which a piston is moved, not by the fluid flow being measured, but by a servomotor, along a chamber in response to a measured pressure difference between the pressure in the chamber and ambient pressure, so as to maintain such pressure difference at a minimum.

U.S. Pat. No. 4,307,601 to Jackson describes a flow calibrator which employs a cylinder containing a mercury-sealed piston which is attached to a counterweight by a tape which is trained over a pulley. The pulley rotates an encoder and pulses from the encoder are counted at regular predetermined time intervals to determine the movement of the piston for each of those time intervals. Jackson's device must be started and stopped by pushbuttons, which prevents automatic operation.

A significant disadvantage of both Raymond and Jackson is that piston displacement must be measured over a predetermined time interval. Intermediate flow readings during such time interval are not available. Also, precision is limited, since Raymond's readings come from a visual scale and even Jackson's digital encoder pulses come too slowly to obtain good precision.

U.S. Pat. No. 3,125,879 to Porter and U.S. Pat. No. 2,927,829 to Porter disclose other flowmeters which include pistons sealed by liquid, preferably mercury.

Also known to the art is a flowmeter with a horizontal shuttling piston for measuring a fluid flow rate. Such prior flowmeters measure the number of complete shuttles in a predetermined length of time.

The disclosures of these and other prior art references mentioned herein are incorporated by reference.

SUMMARY OF THE INVENTION

A central object of the present invention is to improve upon the above-mentioned prior art flowmeters and avoid their disadvantages.

A further object is to develop a flowmeter including a piston and cylinder arrangement, wherein the piston has substantially reduced friction, within the cylinder, approaching zero.

Another object is to make use of a clearance seal in a flowmeter.

A further object is to provide damping of vibrations caused by piston oscillations or by vibration in external equipment.

Another object is to avoid contamination of the system under measurement.

A further object is to enable for the flowmeter to obtain accurate data quickly, even under low-pressure and low-flow conditions.

Yet another object is to compensate for piston leakage.

A further object is to permit remote or automatic operation of the flowmeter.

A still further object is to provide a flowmeter with an improved main control valve.

Another object is to measure piston movement digitally, with precision as well as rapidity.

These and other objects of the invention are attained by the developments disclosed and claimed herein.

According to an embodiment of the invention, the flowmeter employs a virtually frictionless, non-contact piston, eliminating the above shortcomings of the prior art. A clearance seal is formed with the surrounding cylinder. The flow to be measured is connected to the closed end of the cylinder containing the piston. An electrically operated valve serves to apply the flow to the cylinder and to vent the system between readings. Gravity or other means reset the piston to its initial position after a reading.

A fluid flow to be measured, particularly a gas flow, moves the piston through the cylinder. The position of the piston is sensed and the time it takes for the piston to move a certain distance is thereby measured. The flow rate of the fluid flow is then determined as a function of the elapsed time and the given distance.

To begin a reading, the control valve is closed and suction from the pump being calibrated is applied to the piston, which begins to move with the flow. After allowing an appropriate distance for acceleration, if necessary, the time the piston takes to move through a known distance (hence volume) is measured. From this, the flow rate can be calculated, more directly and more precisely than in the prior art devices which instead measured the distance moved during a predetermined time.

Distance can be measured by sensing the piston's position directly in various ways. In the preferred embodiment an encoder, preferably optical, is attached to the piston. In such an encoder, two stripes, apertures, etc. a known distance apart may break or transmit a light beam in a commercially available optical interrupter module, creating pulses. The computer measures the time between the two pulses. Time data are generated, for example, by ticks from a time base which are counted between stripes or windows on the encoder. Any encoding means, such as a magnetic or optical encoder, may be used. Optical encoders are preferred as having less influence on the movement of the piston. As the same optics are used for each pulse, the accuracy of the system are not affected by the optics' characteristics. Use of digital encoders is not possible with the prior art bubble-type flow calibrators.

One means of achieving the required low friction is the use of a cylinder and piston fitted to very close tolerances with an air gap or "clearance seal" which allows a certain predictable but generally negligible leakage. Friction is reduced to virtually zero by the use of the clearance-seal piston. Under low-flow conditions, the system can compensate for the known leakage in order to increase accuracy. The two pieces are made of materials of similar thermal coefficients of expansion, such as a graphite piston in a Pyrex® or borosilicate glass cylinder.

The cylinder may be positioned vertically to allow gravity reset of the piston. When the piston reaches the top of its travel, the valve is opened, preventing further motion and allowing the air to bleed to reduce the vacuum in the cylinder and allow the piston to fall to its lower initial position.

When the valve is closed, the suction of the device being calibrated is suddenly applied to the piston, causing it to accelerate. As the piston moves, the encoder strip breaks the optical interrupter module's light beam periodically. If very high flows are encountered, the rapidity of the first interruptions is detected by the computer connected to the interrupter, which then allows a certain travel to occur (to allow for acceleration) before timing the travel for a known distance and calculating flow. Otherwise, flow can begin being measured immediately. When the piston reaches the top of the cylinder, or after a set number of pulses, the cycle is finished.

The present system is based on counting the number of time ticks per encoder stripe, rather than the prior art method of measuring the piston travel in a given length of time. The present system inherently gives better precision than the known systems, because rapid time ticks can be counted with more accuracy than the relatively crude scale markings and encoder pulses disclosed in Raymond and Jackson.

During measurements of low flow, many seconds may be required for a reading over the full piston travel, for greatest accuracy. Intermediate encoder pulses are available to provide intermediate readings. As each encoder aperture corresponds to a known volume, the intermediate readings can be displayed with gradually improving accuracy. Existing bubble flowmeters cannot do this, as their sensors are a fixed distance apart.

Quasi-continuous readings can be obtained by continuously cycling the apparatus, which cannot be achieved reliably with bubble flowmeters. Remote and automatic operation (e.g, for control and monitoring systems) is possible, as there is no need for fluid, observation of bubble quality and frequent maintenance.

In another embodiment, which is particularly conducive to continuous cycling, four-way valves are arranged to continuously shuttle the piston back and forth in a cylinder, preferably in a horizontal position.

The system is capable of achieving a precision of about 0.2% over a flow range of 100 ml/min to 50 L/min with a single cell, using this virtually frictionless piston instead of the soap film bubbles, mechanically driven pistons, or other means common in prior calibrators. Since the entire system is dry, false readings from poorly formed bubbles and damage to the equipment under calibration are eliminated. The system delivers numerical readings like a meter, and rapidly auto-repeats with great accuracy. Precision readings can be obtained rapidly, in less than one second for flows greater than 170 ml/min, for example, and without the unreliability common with bubble calibrators.

Additional important features of the invention relate to the control valve.

Preferably, some or all of the cylinder, piston, encoder, and valve are formed into a modular assembly which can be removed from the computer/power supply base unit and replaced, to modify the measuring capacity of the flowmeter. Other modular arrangements are possible. Interchangeable large and small cells are provided for fast readings of high and low flows.

Damping devices may be provided for damping both piston oscillations and vibrations in external equipment.

Means may be provided for driving standard printers and other output devices for data logging, including report generation and time and date logging. Means can be provided to identify the particular cell when it is placed on the base unit, for example by electronic means on the cell or by a bar code or the like. Remote control including data readout can be provided as well. The system is battery-powered and usable in the field.

BRIEF DESCRIPTION OF THE DRAWINGS

FIG. 1A is a cross-sectional detail view of the encoder and optical sensor of the embodiment;

FIG. 3 is a cross-sectional detail view of the main control valve of the embodiment;

FIG. 4 is a functional block diagram of the electronic control system of the embodiment;

FIG. 5 is a flow diagram showing process steps carried out in the electronic control system;

FIGS. 6A, 6B and 6C show possible arrangements for damping piston oscillations;

FIGS. 6D and 6E are respectively a cross-sectional view and a plan view of a pneumatic damper particularly for damping vibrations from external equipment;

FIGS. 8A and 8B are respectively a schematic diagram and a cross-sectional view of a shuttling-type flowmeter employing a pair of the SPDT-type control valves of FIGS. 7A and 7B.

DETAILED DESCRIPTION OF THE PREFERRED EMBODIMENTS

Figure 1:
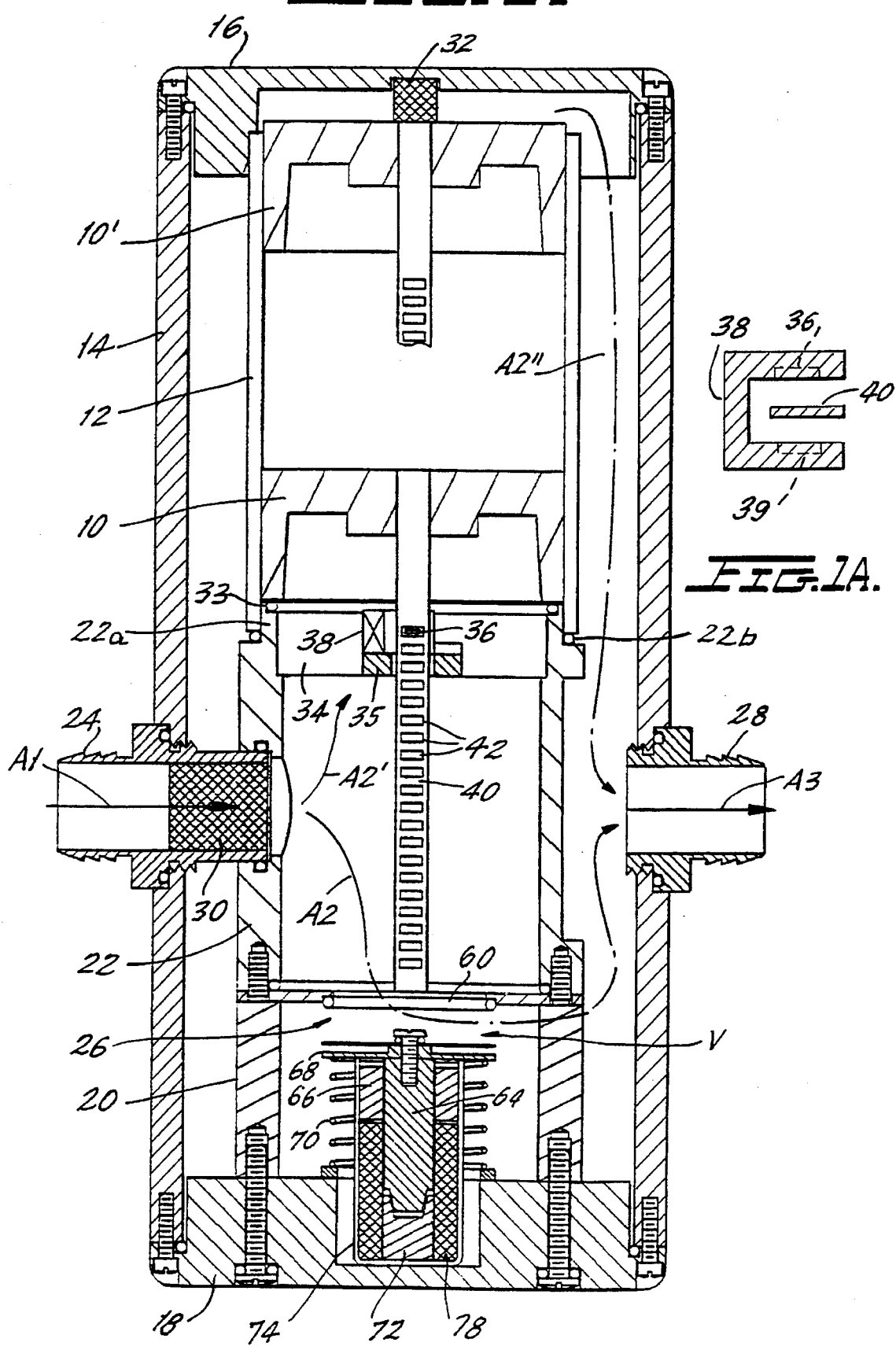
FIG. 1 is a cross-sectional view of an embodiment of the invention.

Referring first to FIG. 1, a first embodiment of the invention includes a piston 10 which is slidable within a cylinder 12 from a bottom position as shown, to a top position 10'. The piston and cylinder are enclosed within an outer tube 14, also preferably cylindrical, which has a top cover 16 and a bottom cover 18. The cylinder 12 is further supported by a lower support 20 and by a center section 22 which is also generally cylindrical.

The lower support 20 has apertures or slots (not shown) to allow gas flow therethrough. A valve V, described in more detail below, is provided to open and close an opening between the interior of the center section 22 and the lower support 20. The valve V is shown open in FIG. 1.

Gas flow with the valve V open will now be described. Suction from a pump to be measured is applied to an outlet 28. Gas enters the flowmeter through an inlet 24 and is filtered by a filter 30. The inlet flow path is indicated by an arrow A1. The gas follows the path of least resistance along an arrow A2, through the opening 26, and past the valve V, and exits the flowmeter through the outlet 28 along a path indicated by an arrow A3.

If the valve V is closed, the opening 26 is blocked. The gas enters the center section 22 along path A1 follows a path indicated by an arrow A2', and causes the piston 10 to displace upward toward the position indicated at 10'. Air within the cylinder 12 displaced upward within the cylinder and follows a path indicated by arrow A2", to exit through the outlet 28

The upward movement of the piston is limited in this embodiment by a rubber or elastomeric bumper 32 on the lower side of the top cover 16. An O-ring 33 serves as a bottom bumper for the piston 10.

Many of the components of the flowmeter are sealed by conventional O-ring seals. O-ring seals are indicated throughout the figures as is customary by pairs of small circles. Unless particularly relevant, the O-ring seals will not be discussed in detail herein.

A sensor support 34 is mounted at the upper end of the center section 22. A conventional optical interrupter assembly mounted on a support plate 35 of the sensor support 34 includes a light source 36 and a sensor 39 mounted in a yoke 38. See FIG. 1A. An encoder strip 40 is attached to the piston 10 and moves upward and downward with it. The encoder strip contains a plurality of evenly spaced apertures 42 which alternately block and unblock a light path from the light source 36 to the sensor 39, which generates signals indicating the presence of the apertures 42 as they pass through the optical interrupter. Of course, encoders having visible marks, magnetic encoders, or other types could be used as well. The processing of the signals from the sensor 39 will be described in more detail below.

In FIG. 1, the inlet and outlet 24, 28 and the piston and cylinder 10, 12 are all relatively large, adapted for measuring a large flow volume. As shown therein, the cylinder is mounted closely surrounding an upstanding cylindrical mounting portion 22a of the center section 22 and the connection therebetween is sealed by an O-ring 22b.

Figure 2:
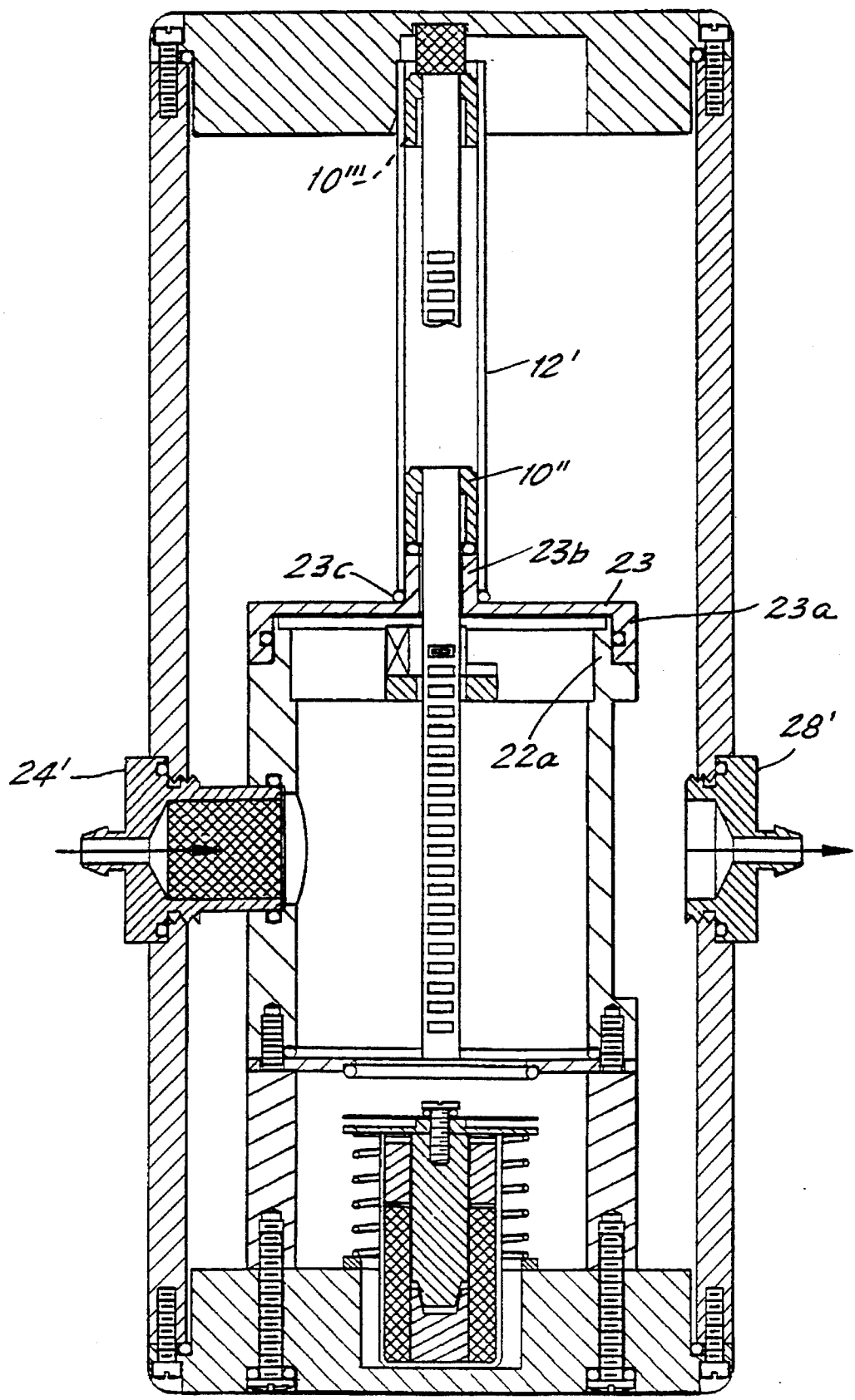
FIG. 2 is a cross-sectional view similar to FIG. 1, having an alternate piston-cylinder cell incorporated in the flowmeter.

FIG. 2 is a view similar to FIG. 1, wherein several interchangeable components have been replaced to adapt the flowmeter for measuring low flow volumes. As shown in FIG. 2, the inlet and outlet 24, 28 have been replaced with inlet and outlet 24', 28', which have smaller diameter and thus lower capacity. Mounted on the upstanding mounting portion 22a is a mounting adaptor 23 having an inside diameter substantially equal to that of the cylinder 12 so as to be mountable on the mounting portion 22a by an outer cylindrical flange 23a. The mounting adaptor 23 has an upstanding cylindrical mounting portion 23b which is radially inward of the flange 23a. The outer diameter of the mounting portion 23b closely matches the inner diameter of a low-capacity cylinder 12' for mounting the cylinder 12' on the mounting portion 23b, sealed by an O-ring 23c. A low-capacity piston 10" is movable, as in the flowmeter of FIG. 1, from a lower position 10" to an upper position 10'". The smaller sizes of the cylinder 12' and piston 10" give the piston a substantial velocity even at the lower flow rate being measured.

Thus, modules for different flow ranges, each module consisting of a cylinder and a piston adapted for the particular flow range, and also a mounting adaptor for each flow range, can be easily mounted on the center section 22 so as to adapt the flowmeter for different flow ranges. Alternate arrangement for modules according to the invention will be discussed further below.

The valve V is shown in detail in FIG. 3. A valve seat 60 is formed in this embodiment by an O-ring made of a flexible elastomer surrounding the opening 26. The movable valve body is formed by a valve disk 62. In FIG. 3, as in FIGS. 1 and 2, the valve is shown as open, with the valve disk 62 away from the valve seat 60.

According to a particularly advantageous feature of the invention, the valve disk 62 is made of a springy material such as Mylar® which can flex or distort to make a tight fit with the valve seat, the valve seat being relatively rigid. A further advantage is that the flexible valve disk 62 absorbs some valve bounce, so the valve opens and closes more securely. The valve disk 62 is held to a retainer plate 68 by a screw 80 and a flexible washer such as an O-ring 82. With this arrangement, the valve disk is free to pivot and turn about its center so as to remain parallel to the valve seat 60, while a squared-off shoulder 83 keeps the valve disk 62 generally in the intended plane. Flexible elastomeric material, for example, may be added to either the valve disk 62 or the valve seat 60 as required. With this arrangement, a large opening 26 can be sealed by applying a small force to the valve disk 62.

This spring-loaded valve and its flexible valve plate both contribute to the further advantage that it can relieve an initial pressure spike which may occur when the valve is first closed but the piston has not yet started to move, to prevent damage, e.g., to external equipment.

The valve disk 62 is moved toward and away from the valve seat 60 by an electromagnetic latch. The valve disk 62 is attached to a plunger 64 made of a magnetic material. Surrounding an upper portion of the plunger 64 is a cylindrical permanent magnet 66. As shown in FIG. 3, the magnet 66 is holding the plunger 64 and with it the valve disk 62 in its lower position. Mounted between the valve disk 62 and the plunger 64 is a retainer plate 68, and between the retainer 68 and the lower cover 18 is a compression spring 70. As shown in FIG. 3, the spring 70 is under compression. The force exerted by the spring 70 on the spring retainer 68 is not great enough to overcome the attractive force of the magnet 66 which holds the plunger down.

A magnetic circuit is formed by the magnet 66, the plunger 64, a plunger seat 72, and a metallic, cylindrically-shaped cup 74 made of a magnetic material which encloses them. An upper end of the cup 74 forms a lower limit of motion for the retainer plate 68. The force of the spring 70 and of the magnet 66 are carefully balanced so that the spring force is close to, but does not exceed the attractive force of the magnet. In order to do this, the spring constant and the degree of compression are selected and a spring seat 76 is provided on the lower cover 18 to provide a desired compression of the spring in the valve-open position. Correspondingly, the magnetic flux path between the plunger 64 and the plunger seat 72 is broken by a gap G, to limit the holding force generated by the magnet 66.

The valve disk 62 is moved upward to its valve-closed position by a solenoid 78, which surrounds the plunger seat 72 and the lower part of the plunger 64 within the cup 74. When energized, the solenoid 78 generates a magnetic flux which bucks the force of the permanent magnet 66, permitting the magnetic force to be overpowered by the upward-directed spring 70, whereby the plunger 64 and with it the valve disk 62 are quickly (about 20 ms.) moved upward to their valve-closed position against the valve seat 60.

From that position, the valve can again be opened by energizing the solenoid 78 in the opposite direction, whereby its magnetic force boosts that of the magnet 66, overpowering the force of the spring 70 and bringing the valve back into the position shown in FIG. 3.

As an alternative to the gap G, a spacer could be disposed to serve as a lower stop for the retainer plate 68, as an alternative means to interrupt the magnetic circuit through the plunger so as to limit the attractive force of the magnet 66.

In either case, the magnetic circuit is interrupted, reducing the magnetic force in the valve-open position to a level just greater than the force of the spring 70. With this arrangement, it is possible with sufficient turns of the solenoid to generate sufficient flux to buck the permanent magnet force with very little electrical energy, over a wide range of power supply voltage, to move the valve to its stable opposite position where it remains without further energy input, which makes a battery-powered valve system possible.

FIG. 4 is a schematic block diagram of the electronic system for detecting and processing movement of the piston 10 and calculating the fluid flow rate.

A microcomputer 100 receives the signals generated by the photodetector 39 indicating the presence of one of the apertures or slots 42. Of course, the computer could alternatively detect the spaces between the apertures. In these detection steps, the measurement can run from the leading edge of one slot to the leading edge of the next slot, from trailing edge to trailing edge, or any other convenient technique. The computer 100 has a display 102, a printer 104 and a plurality of control switches 106 which will be described below in more detail.

In general, the computer 100 processes the signals from the photodetector 39 to determine the length of time the piston 10 takes to travel through a predetermined volume of the cylinder 12. Also shown is an electronically erasable ROM (EEROM) 109 which may be mounted within the measurement cell (FIG. 1) or may be mounted in the base unit with the microcomputer 100, for storing data representative of the leakage of the piston and cylinder of that cell, and/or other data. The EEROM 109 will be discussed further below.

The computer counts ticks from a time base such as a crystal oscillator 108 with an internal counter 110. For example, slots may pass the sensor about every 2 to 3 milliseconds, while the internal clock may generate its ticks about every 4 microseconds (250 kHz). Thus, perhaps 500–1000 ticks may be counted per slot, resulting in great precision.

A flow chart illustrating an embodiment of the process is shown in FIG. 5. At step 200, the flowmeter is turned on and at step 202 the microcomputer memory including the internal counter 110 is initialized. At step 204, it is determined whether a "read" control switch (see 106 in FIG. 4) has been actuated. If so, the computer waits until an encoder aperture or slot (referred to in FIG. 5 as a "slot") has been detected. When a slot is detected at step 206, time ticks from the crystal oscillator 108 are counted. Counting begins at step 208. The computer waits until the next slot is detected (step 210). When this occurs (step 212), the internal counter is read, reset to 0, and counting continues.

At step 214, the counter value obtained at step 212 is examined to determine whether the piston movement is relatively slow or relatively fast. For example, the computer may advantageously determine whether the first 10 slots are detected before or after a given period elapses, for example ¼ to ½ second. Below, ¼-second will be assumed.

If slow, it is possible to generate intermediate flow readings to provide data to the user sooner. Therefore, flow calculation begins with the first slot after the ¼-second period. At steps 216–222, the computer goes through a process wherein for each slot detected, the time ticks detected are counted and an intermediate flow value is calculated and displayed. Each intermediate value is incorporated into a running average value.

At the first pass through step 216, the number of ticks for a first slot is used to calculate the flow rate, which is displayed, and an average is calculated, which is also displayed. At step 218, the slot count is incremented from 0 to 1. At step 220 it is determined whether N slots have been counted, N being the total number of slots on the encoder 40 in this example. If not, then the computer waits for another slot at step 222. When the incremented slot count at step 218 has become equal to N, counting stops because there are no more slots on the encoder.

Therefore, the computer opens the valve V at step 232, which permits the piston 10 to drop back to its rest position by gravity. At step 234, the computer waits a sufficient length of time to permit the piston to fall.

Alternatively, encoder slots could be counted backwards to determine when the piston has reset, or a mechanical end-of-travel indicator could be provided.

Then, at step 236, if a repeat mode has been designated by one of the control switches 106, the computer returns to step 206 to wait for a slot to be detected. If not, the computer returns to step 204 to await an instruction for another reading.

If fast movement has been detected at step 214, then at steps 224–230, the computer counts clock ticks while a certain number of slots are detected, here 8, and the average time per slot for those 8 slots is used to calculate the flow rate. Since each slot corresponds to a known cylinder volume, the time per slot equals the volume flow rate.

Summarizing the above, for a high flow rate, the computer gathers data while several slots are detected after an initial period of acceleration. For low flow rates, the computer can determine sufficient data to determine the flow rate from as few as one encoder slot. In either case, a valid flow reading can be obtained in about the same time, less than about ½-second, which is desirable both to satisfy general laboratory requirements, and to give the user the perception of a fast result.

Further benefits of the disclosed system are that in the slow flow range, even one slot gives enough data to determine flow and even to average out time-dependent irregularities caused, for example, by external pump vibration or piston oscillation. In the fast flow range, several slots are detected and averaged over an extended averaging time to get good data, but still a good reading is obtained in about the same time as with slow flow.

As shown, a self-contained flowmeter cell includes the piston, cylinder, encoder, sensor and valve, all contained within an outer case. The cell is connected to the computer by a conventional connector, for example, on its bottom cover 18, which is electrically connected to the sensor, light source, and valve, for example, by up to six pins of a conventional 9-pin connector. The remaining three pins of such a 9-pin connector can be used to identify the flow capacity of the cell, for example by grounding one or more of those three pins, whereby cells having six different flow ranges can be differentiated.

Alternatively, a modular interchangeable cell may consist of a piston, cylinder, and encoder within an outer case. The sensor and valve may be provided with the computer in a common mounting base. As a further alternative, an interchangeable cell may consist of a piston, cylinder, encoder, and sensor, and only a common valve may be provided in the base.

A leakage compensation feature can also be provided to extend the measurement range to extremely low flow rates. The piston is disposed extremely close to the inside surface of the cylinder 12 to form a clearance seal. For example, the spacing may be about 1.25 microns (50 microinches). Such a clearance seal results in extremely low friction. Although the leakage through this gap is extremely small, it can cause inaccuracy for extremely low flows. For example, if there is 0.01 ml/sec of leakage due to the clearance seal, that defines an upper limit of one percent accuracy when measuring a flow of 1 ml/sec.

To compensate, the amount of leakage can be measured, e.g., by inverting the cell, pushing a "calibrate" control, blocking the inlet, and allowing the piston to fall due to gravity rather than due to an applied flow. The apparent "flow rate" (the time to detect one slot) is the amount of leakage. Such a leakage test can also be part of a self-test performed by the computer, which will detect other defects in the cell as well as the predictable leakage. Once the leakage rate is determined, it can be stored in the EEROM 109 and then added automatically to the flow readings in the low range or in all ranges, to determine the actual flow rate.

The EEROM can be in the computer, or an EEROM or another storage device can be incorporated into the modular cell itself and loaded with the leakage factor, and read automatically by the computer via the connector on the bottom cover 18 when the cell is mounted on its base. The actual leakage can then be measured as described above and compared with the stored leakage as a test to detect defects in the piston and cylinder that may have developed since the leakage factor was stored.

If desired, for example for low flow rates, a conventional seal (not shown) can be provided around the piston, employing a low-viscosity silicone oil or mercury, or a ferrofluidic seal, or another type of seal.

By including temperature and pressure sensors in the cylinder, and providing the computer with parameters for given gases, mass flow can also be measured, for calibrating mass flowmeters.

A highly advantageous feature of the invention is that the piston and cylinder may be made of the same material or similar materials so as to have the same coefficient of formal expansion. For example, the cylinder may be made of borosilicate glass and the piston of graphite. Such a combination provides the additional advantage that the piston will be self-lubricating, if contact between the piston and cylinder should occur. Such contact is unexpected in the normal case, because the disclosed clearance seal forms an air bearing, whereby the piston tends to center itself in the cylinder.

Because there is virtually no friction in the travel of the piston in the cylinder, it is desirable to take measures such as damping to prevent unwanted oscillations in the movement of the piston, and to provide processing techniques that can compensate for oscillation if it occurs. Many methods of damping are known, such as friction, air restriction, viscous damping, electromagnetic damping, or permanent magnetic damping.

For example, a restriction could be placed in the outlet 28, or it could be arranged for the air displaced by the upward movement of the piston to exit the cell through a restricted opening (an extremely small hole, for example) in the top cover 16 (FIG. 6A). A leaf spring (FIG. 6B) could bear on the encoder strip 40, at a pressure plate on the other side of the encoder strip from the leaf spring, creating friction. Or the encoder strip could be made of a magnetic material and a bar magnet could be parallel to and spaced from the encoder strip, which again would create friction with the encoder strip (FIG. 6C). In either of these friction-damping examples, it would be desirable to provide some sort of lubrication or an anti-friction coating such as Teflon®.

Figure 6F:
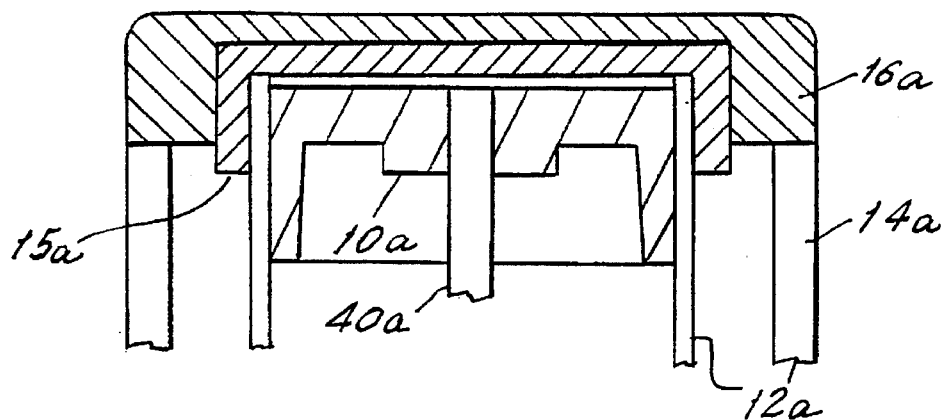
FIG. 6F is a cross-sectional view of a further arrangement for damping piston oscillations.

A particularly good damping arrangement has been found to provide damping which varies according to approximately the first power of piston velocity, which as is known is desirable for obtaining critical damping. Unless damped, the virtually frictionless piston supported by the column of air can oscillate like a mass suspended from a spring. Referring to FIG. 6F, a sheet of open-cell foam 15a is placed to fill the space between the top of the cylinder 12a and the top cover 16a. The air displaced upward by the piston 10a passes through the open-cell foam, providing excellent, near-critical damping. It also serves as a bumper for the piston. The sheet 15a can be compressed by its mounting to adjust its resistance to gas flow.

In another advantageous piston damping arrangement, the bumper 32 in FIG. 1 may be replaced by a porous plug providing the outlet to the exterior of the cover 16 for the air displaced upward by the piston. Such a porous plug can be formed, for example, of foam rubber, which can be compressed in mounting to obtain the proper porosity for any given degree of damping. Such a porous plug also damps approximately as a function of the first power of the velocity of the piston.

A simple restriction such as shown in FIG. 6A is less desirable, because as is known, its resistance varies as the square of the velocity.

Another highly advantageous damping device or pneumatic accumulator is shown in FIGS. 6D and 6E, which is particularly useful for damping vibrations that arise in a pump under test. A flat circular container, such as a flat can with a lid, is provided with holes in its top surface (shown in plan view in FIG. 6E). The center hole is used to locate a spacer, which may be a lightweight ball, or another fixed or adjustable spacer that has no sharp edges and will not stress an elastomeric diaphragm which is stretched across the top of the container and spaced from the top surface. This device provides excellent damping of, e.g., pulsations in the suction of a piston-type pump.

A desirable technique for handling any piston oscillations that may occur is to provide two optical detectors in quadrature. That is, a second detector is offset 90° from the first detector, by one-fourth of the distance between the slots. A second channel from the second detector is used to confirm the first channel. The data from the first channel are used to measure the flow rate as mentioned above. However, the data are not used unless each transition detected by the first detector (i.e., stripe/no-stripe or no-stripe/stripe) is confirmed by the same transition in the same direction at the second detector. For example, if the signal from the first detector goes high, then that signal is not considered valid unless it is followed by the signal from the second detector also going high.

Figure 7A:
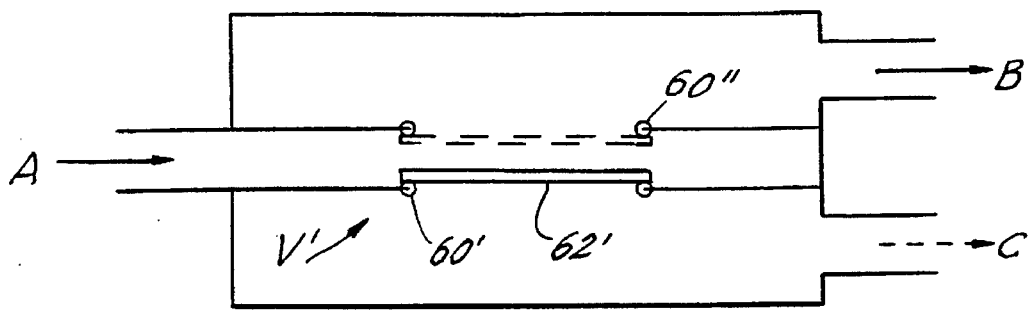
FIGS. 7A and 7B are respectively a schematic diagram and a cross-sectional view of an SPDT-type control valve.
Figure 7B:
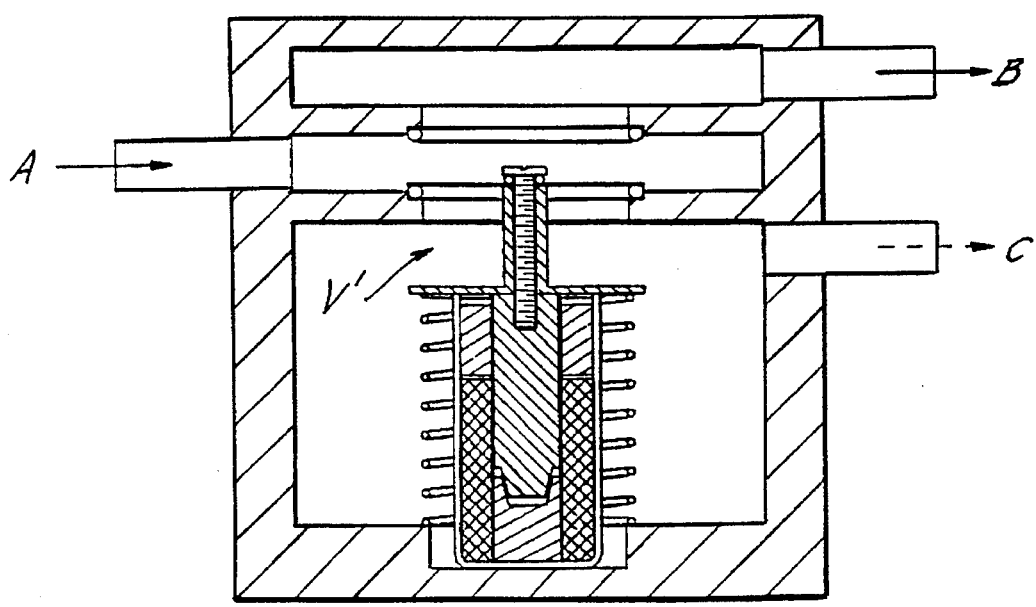

FIG. 7A and 7B show an advantageous two-way or SPDT valve arrangement. As shown schematically in FIG. 7A, an airflow in a channel A can be routed to a channel B by placing the valve V' in its lower position as shown, and can be routed to a channel C by moving the valve V' to the opposite position. A concrete example is shown in FIG. 7B, wherein the valve V' is substantially the same electromagnetic latching valve arrangement as disclosed in connection with FIGS. 1–3, with the addition of a spacer S which prevents the valve disk 62' from being pulled below the level of the lower valve seat 60', which would be likely to damage the valve disk 62' or at least interfere with the smooth operation of the valve.

FIGS. 8A and 8B show examples of a double-acting, totalizing shuttle-type flowmeter. In this embodiment of the invention, the piston shuttles quasi-continuously and time ticks are measured continuously with an electronic arrangement (not shown) similar to that in FIGS. 4 and 5. An advantage of this type of arrangement is that a gravity-driven reset of the piston is not required between measurements, so more data is obtained more quickly. Two of the valves disclosed in FIG. 7B are included in a double-pole, double-throw arrangement. When valves V1 and V2 are in the positions shown in FIG. 8A, air enters through the inlet IN and passes toward the upper-right as seen in FIG. 8A, driving the piston P downward in a chamber C, and air displaced by such movement exits the chamber C toward the upper left, through the outlet OUT. If the position of valves V1 and V2 is reversed, air enters through the inlet IN, moves toward the right, drives the piston P upward, and displaced air is driven toward the left in FIG. 8A and out through the outlet OUT. A concrete embodiment corresponding to FIG. 8A is shown in FIG. 8B.

Although the present invention has been described in connection with preferred embodiments thereof, many other variations and modifications will now become apparent to those skilled in the art. It is preferred, therefore, that the present invention be limited not by the specific disclosure herein, but only by the appended claims.

What is claimed is:

1. A modular gas flowmeter comprising:

a receiver for receiving a gas whose flow rate is to be measured and guiding said gas to an interchangeable modular cell which is removably and replaceably supported on said receiver;

said cell comprising an enclosure of a predetermined volume which corresponds to a predetermined flow rate range, and a piston which is arranged for being moved within said enclosure by said gas;

a support arrangement for permitting a plurality of cells of different volumes which correspond to different flow rate ranges to be supported on said receiver; and a detector which detects movement of said piston and generates therefrom electrical signals representative of said flow rate to be measured;

wherein said detector generates said electrical signals as a function of a known volume of said enclosure traversed by the piston, and a measured variable elapsed time over which the piston traverses such volume.

2. A flowmeter as in claim 1, wherein an outer surface of the piston and an inner surface of the enclosure are substantially cylindrical and form a clearance seal.

3. A flowmeter as in claim 2, wherein said clearance seal forms an air bearing during said movement which self-centers the piston in the enclosure.

4. A flowmeter as in claim 1, further comprising a piston position indicator which generates a signal for each said unit of volume, and said detector counts multiple clock signals from a clock for each said signal.

5. A flowmeter as in claim 1, further comprising a piston position indicator, and one single sensor associated with said indicator for generating said electrical signals.

6. A flowmeter as in claim 1, wherein a position indicator for said piston, which coacts with said detector for detecting piston movement, is included in said interchangeable modular cell.

7. A flowmeter as in claim 6, wherein said receiver further comprises an interchangeable valve which is included in said interchangeable modular cell.

8. A flowmeter as in claim 1, further comprising an identifying device on said receiver which is capable of coacting with an identifying portion of said cell to identify said cell to said detector upon mounting, from among a plurality of cells of different sizes.

9. A flowmeter as in claim 1 wherein said detector further comprises means for measuring mass flow as a function of said fluid flow.

10. A flowmeter as in claim 1, further comprising damping means for damping oscillations of said piston with respect to said enclosure.

11. A flowmeter as in claim 10, wherein said damping means provides damping approximately as a function of the velocity of the piston.

12. A flowmeter as in claim 10, wherein said damping means creates mechanical friction in response to movement of said encoder.

13. A flowmeter as in claim 10, wherein said damping means includes a restriction in a flow path of fluid displaced by movement of said piston.

14. A flowmeter as in claim 10, wherein said damping means includes an open-cell foam body in a flow path of fluid displaced by movement of said piston.

15. A flowmeter as in claim 1, wherein said enclosure has a known capacity; and further comprising:

a memory device for supplying data representative of said capacity; and a calculator responsive to said detector and to said memory device for calculating and outputting data representative of said fluid flow.

16. A flowmeter as in claim 15, wherein said calculator is in said receiver, and said receiver has a connector for connecting said memory device to said calculator.

17. A flowmeter as in claim 16, wherein said memory device is on said enclosure.

18. A flowmeter as in claim 16, wherein said memory device is on said receiver.

19. A flowmeter as in claim 15, wherein said enclosure also has a known leakage rate, and data representative of said leakage rate are stored in said memory device.

20. A flowmeter as in claim 19, wherein said memory device is an electrically alterable semiconductor memory.

21. A flowmeter as in claim 19, wherein said memory device is a potentiometer.

22. A flow meter as in claim 19, wherein said memory device is a non-volatile information storage device.

23. A method of measuring gas flow comprising the steps of:

providing a plurality of interchangeable modular flowmeter cells, each comprising an enclosure having a respective volume which corresponds to a respective range of flow rates to be measured, and a piston which is arranged for being moved within said enclosure by said gas whose flow rate is to be measured;

selecting one of said cells corresponding to a desired flow rate range to be measured;

mounting said selected cell on a receiver;

guiding said gas whose flow rate is to be measured through said receiver to said cell for moving said piston within said enclosure; and detecting movement of said piston and generating therefrom electrical signals representative of said flow rate to be measured, as a function of a known volume of said enclosure traversed by said piston, and a measured variable elapsed time over which the piston traverses such volume.

24. A method of measuring fluid flow, comprising the steps of:

providing a modular flowmeter cell, comprising a plurality of differently-sized receiving means which are sized and shaped for receiving a corresponding plurality of enclosures having different volumes so as to be capable of measuring different flow rates;

providing a piston and a selected enclosure removably supported on said cell, within which the piston is slidable;

introducing a fluid flow to be measured so as to cause said piston to move within the enclosure; and detecting said fluid flow as a function of said piston movement, including the step of measuring a variable elapsed time over which the piston traverses a known volume of the enclosure.

25. A flowmeter as in claim 8, wherein said identifying device further provides said detector with a predicted leakage rate for said cell.

26. A flowmeter as in claim 8, wherein said identifying device provides said detector with a flow range of said cell.

* * * * *